United States Patent

Kawanishi et al.

[11] Patent Number: 4,967,856
[45] Date of Patent: Nov. 6, 1990

[54] COMBINATION WEIGHING MACHINE

[75] Inventors: Shozo Kawanishi, Kobe; Tadashi Higuchi, Akashi, both of Japan

[73] Assignee: Yamato Scale Company, Limited, Akashi, Japan

[21] Appl. No.: 390,451

[22] Filed: Aug. 4, 1989

Related U.S. Application Data

[63] Continuation of Ser. No. 901,000, Aug. 27, 1986.

[30] Foreign Application Priority Data

Dec. 2, 1985 [JP] Japan ............................ 60-271798

[51] Int. Cl.$^5$ .................... G01G 13/00; G01G 13/22
[52] U.S. Cl. ................................. 177/25.18; 177/1; 177/91
[58] Field of Search ............... 177/1, 25.18, 90–92

[56] References Cited

U.S. PATENT DOCUMENTS

| | | | |
|---|---|---|---|
| 3,966,000 | 6/1976 | Allen | 177/91 X |
| 4,137,976 | 2/1979 | Grayson, Jr. | 177/1 |
| 4,258,809 | 3/1981 | JOnes | 177/1 |
| 4,344,492 | 8/1982 | Hirano | 177/25 |
| 4,418,771 | 12/1983 | Henry et al. | 177/25.18 X |
| 4,437,527 | 3/1984 | Omae et al. | 177/25.18 |
| 4,446,938 | 5/1984 | Kawanishi | 177/25 |
| 4,470,166 | 9/1984 | Hirano | 177/1 |
| 4,534,430 | 8/1985 | Steel | 177/25.18 |
| 4,538,693 | 9/1985 | Klopfenstein et al. | 177/25.18 |
| 4,616,722 | 10/1986 | Moran | 177/99 |
| 4,618,011 | 10/1986 | Sashiki et al. | 177/1 |

FOREIGN PATENT DOCUMENTS

| | | |
|---|---|---|
| 32460 | 7/1981 | European Pat. Off. . |
| 52498 | 5/1982 | European Pat. Off. . |
| 59-10815 | 1/1984 | Japan . |
| 2123956 | 2/1984 | United Kingdom . |
| 2131963 | 6/1984 | United Kingdom . |

Primary Examiner—George H. Miller, Jr.
Attorney, Agent, or Firm—Senniger, Powers, Leavitt & Roedel

[57] ABSTRACT

A combination weighing machine of the type comprising a plurality of weighing units for weighing product fed thereto and providing weight signals indicative of the weights thereof, respectively, means for selecting an optimum combination of these weight signals which satisfies a predetermined condition, and means for discharging the product from those weighing units corresponding to the selected combination for deliver a batch of product satisfying the prescribed condition; in which, as the feature of invention, each weighing unit is provided with a plurality of weighing chambers and a single weigher or weight sensor for providing a weight signal indicative of the total weight of all weighing chambers and associated with loading means for selectively loading the weight chambers with product and means for detecting the weight of product in each weighing chamber and storing it, and the combination selecting means and the discharging means are arranged to select the optimum combination from all weighing chambers of all weighing units and discharge the product from those weighing chambers corresponding to the selected combination.

15 Claims, 9 Drawing Sheets

COMBINATION WEIGHING MACHINE

This is a continuation of co-pending application Ser. No. 901,000 filed on Aug. 27, 1986.

This invention relates to an improved combination weighing machine.

As well known in the art, a combination balance or combination weighing machine is a weigher for measuring weights of a plurality of sub-batches of product and selecting from these weights an optimum combination satisfying a predetermined weight condition for delivery of a desired batch of product.

As disclosed for example, in U.S. Pat. No. 4,344,492, one type of conventional combination weighing machine comprises a plurality of weighing hoppers each provided with a weight sensor, and an optimum combination is selected from the weight signals provided by these weight sensors. As readily understood, the accuracy of the selected combination, that is, the deviation of the value of the selected combination from a predetermined target value would be improved by increasing the number of sub-batches of product which can participate in the combination selection. However, an increase in the number of weighing hoppers each having an expensive weight sensor would result in a substantial increase in the machine price. One way of increasing the number of active sub-batches of product without increasing the number of weighing hoppers is proposed in U.S. Pat. No. 4,446,938. In the device of this patent, each weighing hopper is accompanied by an auxiliary hopper and a corresponding memory, and means is provided for selectively directing the product from the weighing hopper either into the auxiliary hopper or directly into a collection chute. In this device, the product is transferred to the accompanying auxiliary hopper after it is weighed the weight information is stored in memory and, the emptied weighing hopper is re-loaded with new product. The desired combination is then selected from the sub-batches of product not only in the weighing hoppers but also in the auxiliary hoppers. Thus, the number of sub-batches of product is doubled without increasing the number of weighing hoppers, and the accuracy of the selected combination is improved without substantial increase in machine price, as compared with the case where the number of weighing hoppers is doubled.

However, the auxiliary hoppers of the above patent are generally disposed immediately under the corresponding weighing hoppers in order to allow the product in the weighing hoppers to fall by gravity into the underlying auxiliary hoppers. This arrangement of auxiliary hoppers has unavoidably resulted in an undesirable increase in the machine height, which may significantly confine the space of installation. Moreover, such arrangement has required deflecting means for diverting the product falling from the weighing hopper to the outside of the underlying auxiliary hopper so that it falls directly into the collection chute when only the weighing hopper has been selected in the combination (but the underlying auxiliary hopper has not been selected). Addition of such mechanism, together with the auxiliary hoppers, has necessarily resulted in a complicated mechanical structure which may introduce various troubles in maintenance and service of the machine.

SUMMARY OF INVENTION

Accordingly, an object of this invention is to provide a novel and improved combination weighing machine having no auxiliary hoppers so as to reduce the machine height and complexity as compared with the abovementioned prior art without reducing the number of sub-batches of product which can participate in the combination selection process.

According to this invention, a combination weighing machine comprises a plurality of weighing hoppers associated respectively with a weigher, or weight sensor, and each weighing hopper is divided into two or more weighing chambers. Each weighing hopper is accompanied with means for selectively loading these chambers with new product and means for detecting the weight of product in each chamber from the output of the weigher and storing the same. The machine also comprises means for selecting a desired combination from the sub-batches of product in all weighing chambers of all weighing hoppers and means for discharging the product from those chambers corresponding to the selected combination.

Also, according to the invention, a combination weighing apparatus produces a weight of product closely approximating a target weight. The apparatus includes a plurality of weigh scales, each scale having multiple bins for receiving and discharging multiple quantities of product, respectively. A sensor detects the aggregate weight of product in the bins of the scale at any given time and generates a corresponding weight signal. Feeder means delivers a quantity of product to each bin of the scales. Reading and storing means connected with the plurality of scales and responsive to the generated weight signals determines and stores separately the weight of product in each bin of the scales. Combination searching means connected with the reading and storing means selects from the stored weights an acceptable combination of bins that yields a total weight of product closely approximating a target weight. Control means discharges the total weight of product from the acceptable combination of bins.

The invention also includes a method of obtaining a weight of product closely approximating a target weight by combining selected weights of product from a plurality of weighing scales. The method according to the invention comprises the following steps: providing on each weigh scale of the plurality multiple bins for receiving and discharging weights of product, each weigh scale generating a weight signal representative of the aggregate weight of product in all of the bins of the scale at any given time; delivering a quantity of product to each bin of the scales in the plurality, each bin receiving the delivered product at a time different from the other bins of the same scale; reading the weight signals from the scales after each delivery, and determining the weight of product in each bin from the read weight signals; searching the determined weights of product in the bins for selection of an acceptable combination of bins that yields a combined weight of product closely approximating a target weight; and discharging the combined weight of product into a receiver from the acceptable combination of bins.

BRIEF DESCRIPTION OF DRAWINGS

Now, the invention will be described in more detail about some preferred embodiments with reference to the accompanying drawings.

In the drawings.

DESCRIPTION OF PREFERRED EMBODIMENTS

Figure 1:
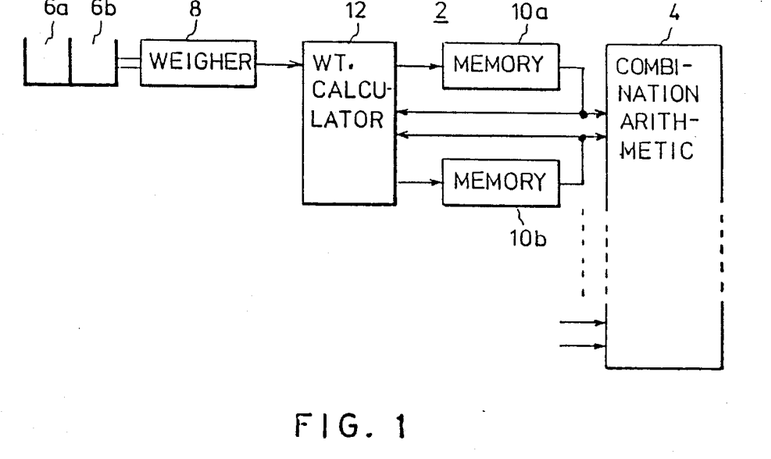
FIG. 1 is a block diagram representing a schematic configuration of this invention.

Referring to FIG. 1, a combination weighing machine of this invention includes a plurality of weight detecting scales or units 2 (only one of which is shown for simplicity) coupled to a common combination arithmetic unit 4 which serves a function of combining incoming weight signals to select an optimum combination therefrom as in prior art combination weighing machines. Two weighing bins or chambers 6a and 6b constituting two separate product containers for receiving and discharging multiple quantities of product are mechanically coupled to a weigher 8, such as a load cell, or sensor which senses the total (aggregate) weight of product in both weighing chambers 6a and 6b to provide a corresponding weight signal to the weight detecting unit 2. The weight detecting unit 2 includes a weight calculating device 12 for calculating the respective weights of product in both chambers 6a and 6b from weight information from the weigher 8 in the manner described later, and two weight memories 10a and 10b for storing the calculated weights for weighing chambers 6a and 6b, respectively. The contents of memories 10a and 10b are supplied to the combination arithmetic unit 4 for a combination selecting operation, and also returned to the device 12 for weight calculation.

Figure 2:
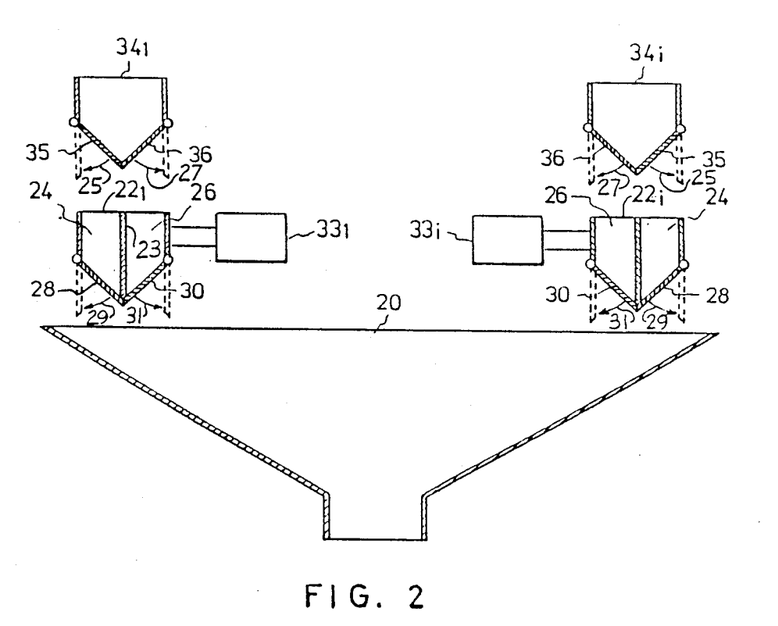
FIG. 2 is a schematic sectional side view representing an essential mechanical configuration of a first embodiment of this invention.

In a first embodiment of this invention, as shown in FIG. 2, a simple funnel-like collection chute 20 is disposed in the center and a plurality of weighing hoppers $22_1, 22_2, \ldots 22_n$ are arranged circularly around the periphery of the chute 20 (only two diametrically facing weighing hoppers $22_1$ and $22_i$ are shown for simplicity). Each of the weighing hoppers $22_1$ to $22_n$ is divided by partition means comprising a partition 23; into two discharge chutes or chambers 24 and 26 and the chambers 24 and 26 have controlled discharge gates 28 and 30, respectively, at their bottoms. Gates 28 and 30 are pivotally mounted on opposing sides of the weighing hopper and form a "V" on the bottom of the weighing hopper. Partition 23 is positioned generally at the vertex of the "V" formed by gates 28 and 30. Gates 28 and 30 pivotally open as indicated by arrows 29 and 31, respectively, to feed product in chambers 24 and 26 into chute 20. The weighing hoppers $22_1$ to $22_n$ are mechanically coupled to weighers $33_1$ to $33_n$, such as load cells, respectively, for sensing the total weight of product contained in both chambers 24 and 26 of each weighing hopper to provide a corresponding weight signal. Loading hoppers $34_1, 34_2, \ldots 34_n$ are arranged circularly immediately above the weighing hoppers $22_1, 22_2, \ldots 22_n$ so as to keep one-to-one correspondence and vertical alignment therebetween. Each loading hopper has a pair of controlled French doors 35 and 36 pivotally mounted on opposing sides of the loading hopper and forming a "V" on the bottom of the loading hopper. Partition 23 is positioned generally in-line with the vertex of the "V" formed by doors 35 and 36. Each loading hopper serves to hold a certain amount of product fed from a feeding device (not shown) disposed above it and to feed the product into the weighing chamber 24 when the door 35 is pivotally opened as indicated by arrow 25, and into the chamber 26 when the door 36 is pivotally opened as indicated by arrow 27. The gates 28, 30, 35 and 36 are arranged to close automatically upon completion of discharging their contents.

Figure 3:
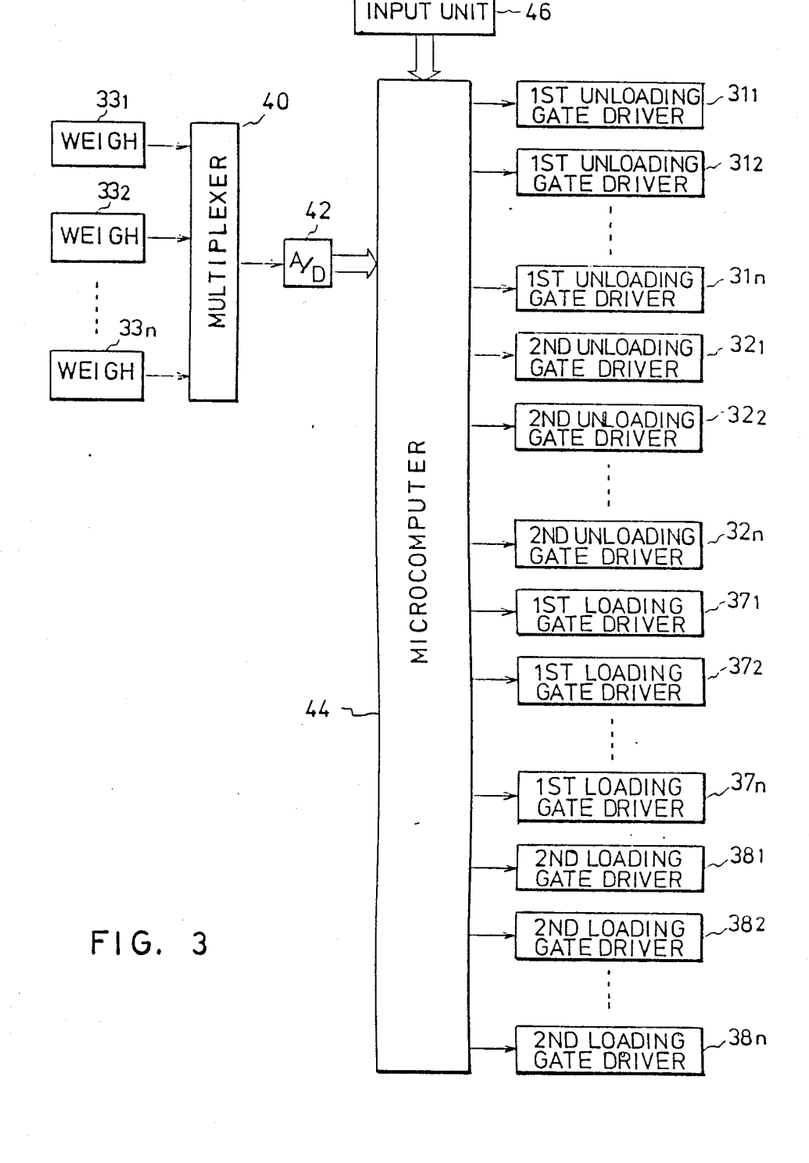
FIG. 3 is a block diagram representing an essential electrical configuration of the first embodiment.

Referring to FIG. 3, the analog weight signals from respective weighers $33_1$ to $33_n$ are supplied through a multiplexer 40 to an analog-to-digital (A/D) convertor 42 in which they are converted into digital weight signals applied to a microcomputer 44. The multiplexer 40 is controlled by the microcomputer 44 and is provided for reducing the number of A/D convertors 42. Therefore it can be omitted when the A/D convertor is associated with each weigher.

The microcomputer 44 also receives upper and lower limit values UL and LL of a predetermined allowable range of weight, which may be input from an input unit 46 such as digital keyboard. The microcomputer 44 may be of a conventional type including a central processing unit (CPU), read-only memory (ROM), random-access memory (RAM) and input and output ports as well known in the art. The microcomputer 44 also controls is arranged to execute combination arithmetic operation shut as exchanging data with RAM on the basis of the digital weight signals and the upper and lower limit values UL and LL in accordance with a program previously written in ROM. The microcomputer 44 also controls first unloading gate drivers $31_1$ to $31_n$, second unloading gate drivers $32_1$ to $32_n$, first loading gate drivers $37_1$ to $37_n$, second loading gate drivers $38_1$ to $38_n$ and multiplexer 40 in accordance with the result therein. The first and second unloading gate drivers are coupled respectively to the first and second gates 28 and 30 of respective weighing hoppers to individually actuate them, and the first and second loading gate drivers are coupled respectively to the first and second gates 35 and 36 of respective feeding hoppers to individually actuate them.

Figure 4:
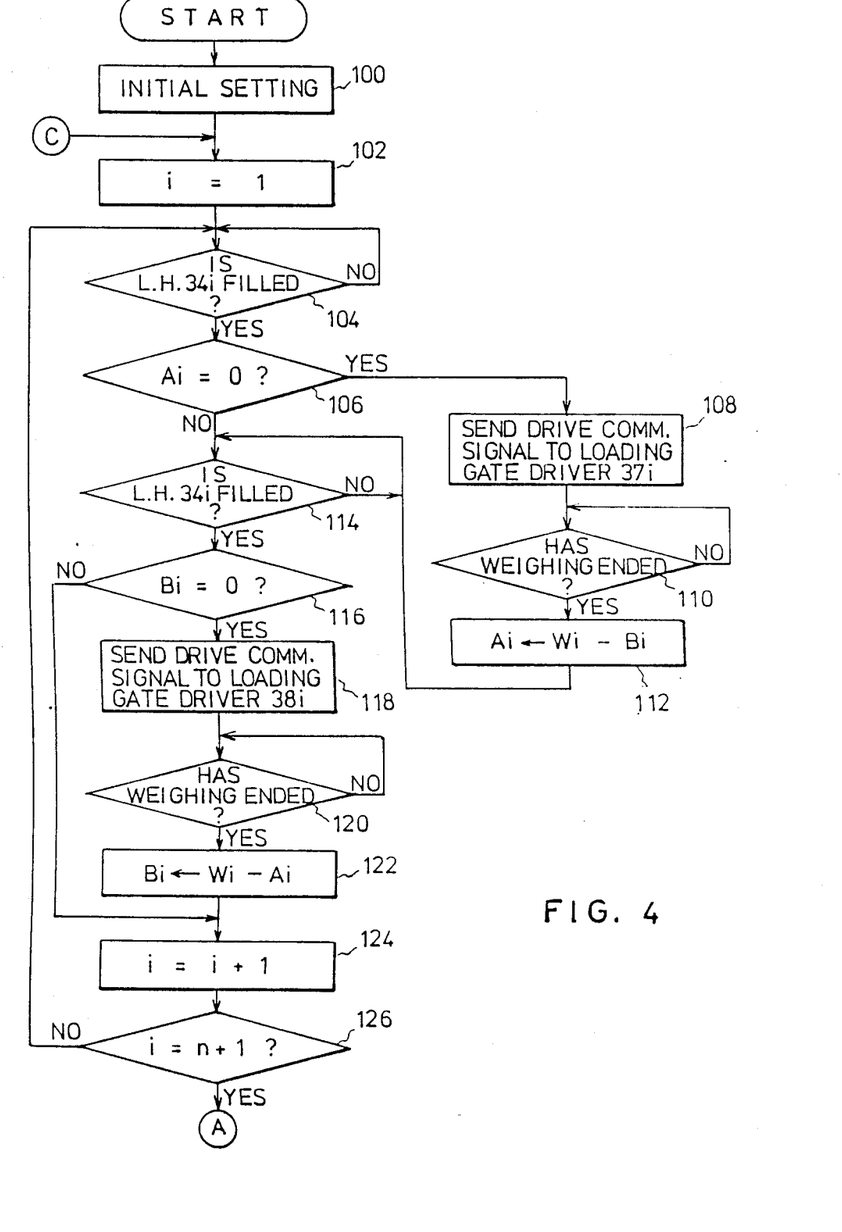
FIG. 4 is a flow chart representing a loading sequence of operation of the first embodiment.

Now, a description will be made about the operation of the device in accordance with the program written in ROM in microcomputer 44 with reference to FIGS. 4 to 6. It is assumed for this purpose that both chambers 24 and 26 of all weighing hoppers $22_1$ to $22_n$ are initially empty. When the program starts, initial setting is effected in step 100 of the loading sequence as shown in FIG. 4. In this step, the upper and lower limit values UL and LL preset in the input unit 46 (FIG. 3) are read in to microcomputer 44 and memory locations A1 to An corresponding respectively to the first chambers 24 of weighing hoppers $22_1$ to $22_n$ and memory locations B1 to Bn corresponding respectively to the second chambers 26 of weighing hoppers $22_1$ to $22_n$ are cleared (i.e., set to zero).

Next, a count value i of a counter in the microcomputer 44 is used for specifying a corresponding one of weighing hoppers $22_1$ to $22_n$ and a corresponding weigher $33_i$, loading hopper $34_i$, unloading gate drivers $31_i$ and $32_i$, loading gate drivers $37_i$ and corresponding $38_i$ and memory locations Ai and Bi is set to "1". Thus, the weighing hopper $22_1$ and corresponding weigher $33_1$, loading hopper $34_1$, gate drivers $31_1$, $32_1$, $37_1$ and $38_1$ and memory locations A1 and B1 have been specified.

After step 102, it is inquired in step 104 whether the loading hopper $34_i$ (now, $34_1$) is filled with product or not. This judgement may be accomplished, for example, by a photoelectric sensor in each loading hopper. If the answer is "NO", step 104 is repeated until the answer becomes "YES".

After A "YES" results in step 104, it is inquired, in step 106, whether the content of location Ai is zero or not. If "YES", a drive command signal is provided to the first loading gate driver $37_i$ in step 108, thereby opening the gate 35 of loading hopper $34_i$ to feed the contents into the first chamber 24 of weighing hopper $22_i$. This results in a corresponding analog weight signal from the weigher $33_i$, applied through multiplexer 40 to A/D convertor 42. The converter 42 converts it into a digital weight signal Wi and supplies Wi to microcomputer 44 (c.f. FIG. 3). It is then inquired in step 110 whether the weighing operation has ended or not, that is, the weight signal Wi has become stable or not. If not, this step 110 is repeated until the answer becomes "YES". If "YES" is obtained, the content of memory location Bi is substracted from the digital weight signal Wi and the result is stored in location Ai in step 112. At first, the digital weight signal Wi indicative of the weight of product in the first chamber 24 of weighing hopper $22_i$ is stored as it is in location Ai, since the second chamber 26 is empty and corresponding location Bi is zero.

In the next step 114 it is again inquired whether the loading hopper $34_i$ is filled with product or not and if not, this step is repeated until "YES" is obtained. If "YES" is obtained it is further inquired in step 116 whether the memory location Bi is zero or not. If the answer is "YES", a drive command signal is applied to the second loading gate driver $38_i$ in step 118, thereby opening gate 36 of loading hopper $34_i$ to feed the contents into the second chamber 26 of weighing hopper $22_i$. The weight signal Wi thus increases, Wi. It is then inquired, in step 120 whether the weighing operation has ended or not, that is, whether the weight signal Wi has become stable or not and, if not, this step is repeated until "YES" is obtained. When "YES" is obtained, the weight signal Wi indicates the total weight of product in both chambers 24 and 26 of weighing hopper $22_i$. Then, in step 122 the content of location Ai (that is, the weight of product in the first chamber 24) is subtracted from Wi and the result indicative of the weight of product in the second chamber 26 is stored in location Bi.

Then, the count i of the counter is incremented by one in step 124 and it is inquired, in step 126, whether the value i is equal to n plus one or not. If not, the program returns to step 104 and the above operation is repeated for the new count i. Thus, when "YES" is obtained in step 126, both chambers 24 and 26 of all weighing hoppers $22_1$ to $22_n$ are filled with product and the corresponding weights are stored in respective locations A1 to An and B1 to Bn.

Figure 5:
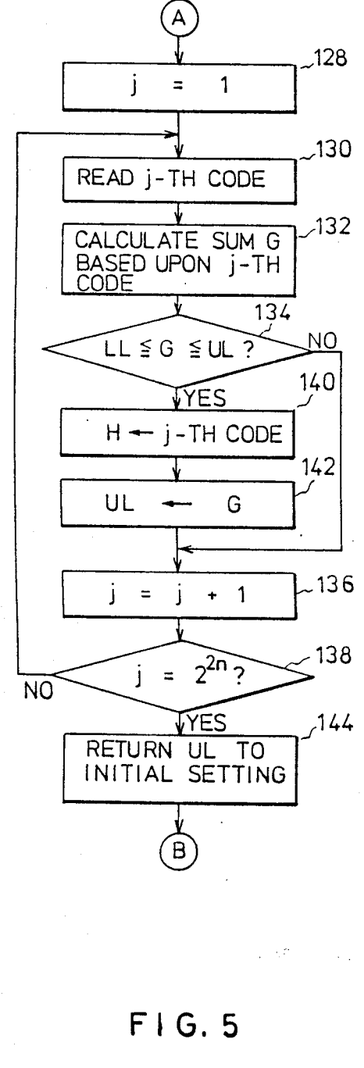
FIG. 5 is a flow chart representing a combination selecting sequence of operation of the first embodiment.

When a ready condition occurs, the program enters a combination selecting sequence as shown in FIG. 5. In this sequence the count value j of another counter in the microcomputer is used for speciying a combination code and is set to "1" in step 128. Each combination code is a 2n-bit binary code and its 2n bits corresponding respectively to the first and second chambers of weighing hoppers $22_1$ to $22_n$. The logic high level "1" of a bit means that the corresponding chamber is included in a selected combination, while the logic low level "0" means that the corresponding chamber has not been selected. As well known, the total number of such codes is $2^{2n}-1$ and these codes are identified by the code numbers 1, 2, ... j, ... $2^{2n}-1$, respectively, and stored in ROM of microcomputer.

One of such codes specified by count j (j-th code) is read out in step 130 and the sum weight G is calculated from the contents of those memory locations A1 to An and B1 to Bn corresponding to logic "1" bits of j-th code in step 132. Then it is inquired in step 134, whether the calculated sum weight G falls within the allowable range between LL and UL or not. If not, the count j is incremented by one in step 136 and it is inquired in step 138 whether j is equal to $2^{2n}$ or not. If not, the program returns to step 130. During repetition of steps 130, 132, 134, 136 and 138, "YES" will be obtained in step 134. Then, the current j-th code is stored in memory location H in RAM of microcomputer in step 140 and the value of upper limit UL is changed into the current sum weight G in step 142. Thereafter, each time "YES" is obtained in step 134. The valve of upper limit UL will be reduced. Accordingly, when "YES" is obtained in step 138, that is, all combination codes have been read out, the memory location H stores a combination code giving a sum weight G which is greater than and closest to the lower limit LL. At this time, the upper limit UL is reset to its initial prescribed value in step 144 and the program proceeds to the following unloading sequence shown in FIG. 6.

In the unloading sequence, the count i is reset to "1" in step 146 and it is inquired in step 148 whether the bit of the combination code stored in memory location H, which corresponds to Ai, is logic "1" or not, that is, whether the first chamber 24 of weighing hopper $22_i$ is included in the selected combination or not. If "YES", a drive command signal is applied to the first unloading gate driver $31_i$ in step 150, thereby opening the gate 28 of the first chamber 24 of weighing hopper $22_i$ to discharge the contents into the collection chute 20. Then, the corresponding memory location Ai is zeroed in step 152.

After to step 152 or if the answer in step 148 was "NO", it is inquired in step 154 whether the bit of the combination code stored in location H, which corresponds to Bi, is logic "1" or not. If "YES", a drive command signal is applied to the second unloading gate driver $32_i$ in step 156 to open the gate 30 of the second chamber 26 of weighing hopper $22_i$ to discharge its content into the collection chute 20. Then, the corresponding memory location Bi is zeroed in step 158. Thereafter, the count i is incremented by one in step 160 and it is inquired in step 162 whether i is equal to n plus one or not, that is, the judgement has been effected for all bits of the combination code stored in location H or not. If not, the program returns to step 148 and the same operation are repeated. Accordingly, when "YES" is obtained in step 162, all chambers included in the selected combination have completed discharge of their contents into the collection chute 20.

When the answer in step 162 is "YES", the program returns to step 102 of the loading sequence (FIG. 4). In this sequence, steps 102, 104 and 106 are executed in the same fashion as described previously. If the answer in step 106 is "YES", the first chamber 24 of weighing hopper $22_i$ has been emptied. Therefore, this chamber is filled with new product and its weight is stored in location Ai in steps 108, 110 and 112. If the answer in step 106 is "NO", this chamber is filled with product. Therefore, steps 114 and 116 are executed. If the answer in step 116 is "YES", the second chamber 26 is empty. Therefore, steps 118, 120 and 122 are executed to fill the chamber with product and to store its weight in location Bi. When the answer in step 126 becomes "YES" again, both chambers 24 and 26 of all weighing hoppers have been refilled with product and the corresponding weights of product are stored in the corresponding A and B locations. Thus, the ready condition again occurs and the combination selecting sequence of FIG. 5 is resumed.

In the above-described embodiment, after the product included in the selected combination is discharged, each emptied chamber is reloaded with new product which is then weighed, and the next combination selection is effected thereafter. Accordingly, the number of product batches, that is, the number of weighing chambers participating in the combination selection is always 2n. However, it is unnecessary to keep the number of product batches always 2n and, if the emptied chambers are excluded from participating in the next combination selection, the combination selection can be commenced earlier and the discharge rate increased. Such operation is referred to as "double-shift" operation and described, for example, in U.S. Pat. Nos. 4,385,671 and 4,470,166 in conjunction with the device in which each weighing occurs in a single weighing chamber. The device of this invention can be operated similarly with a program as shown in FIGS. 7 and 8.

Figure 6:
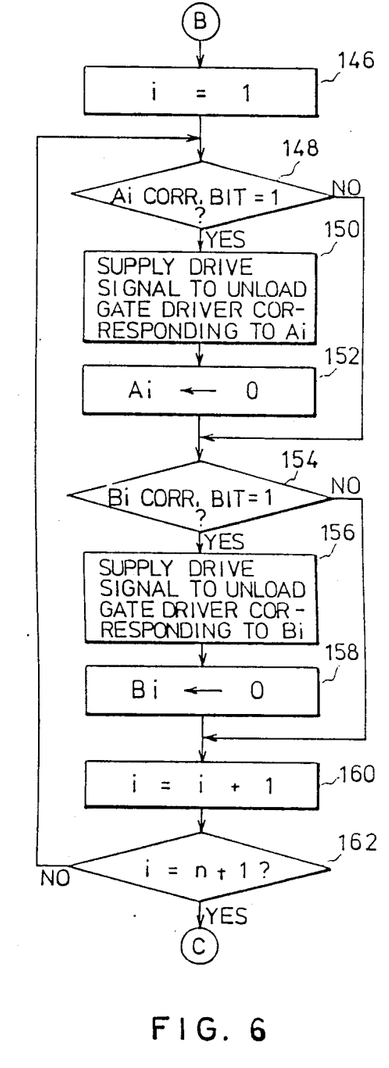
FIG. 6 is a flow chart representing an unloading sequence of operation of the first embodiment.
Figure 7:
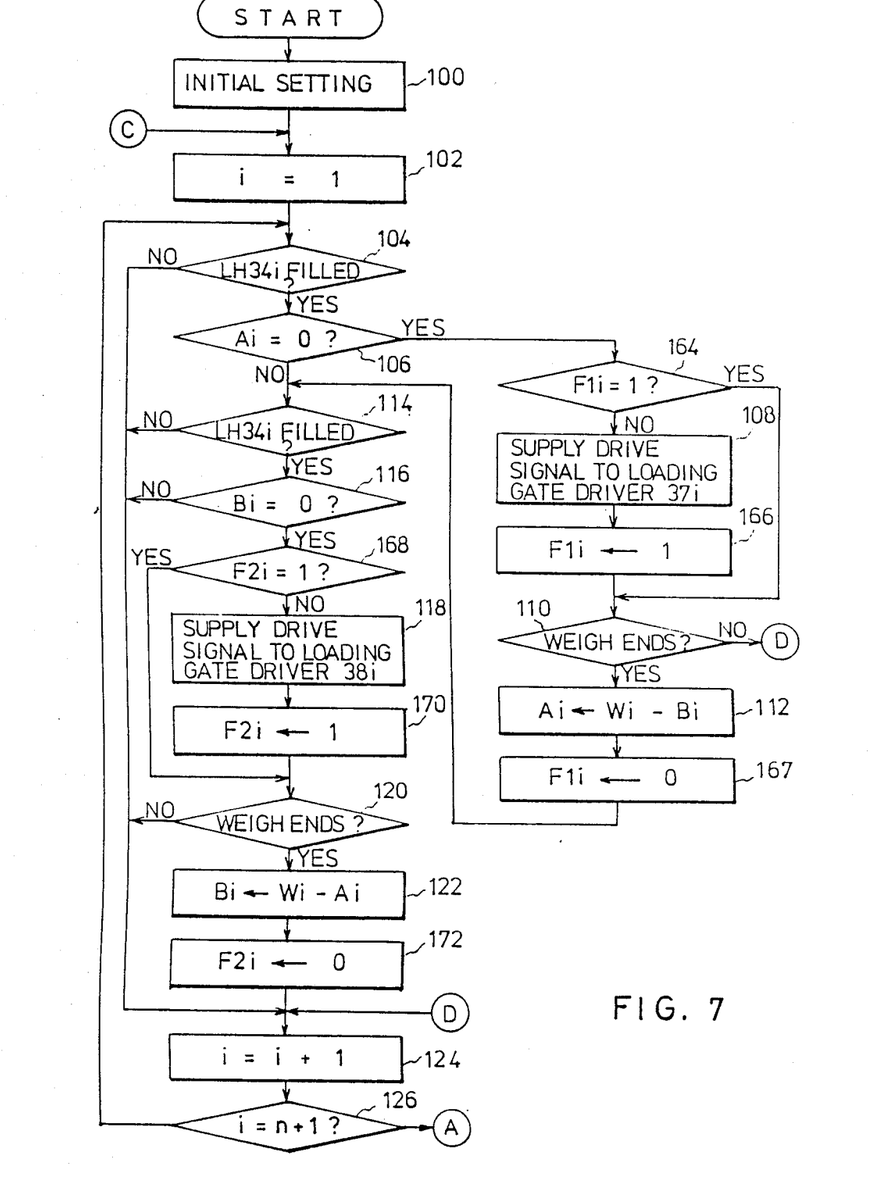
FIG. 7 is a flow chart representing a loading sequence of operation of a second embodiment of this invention.
Figure 8:
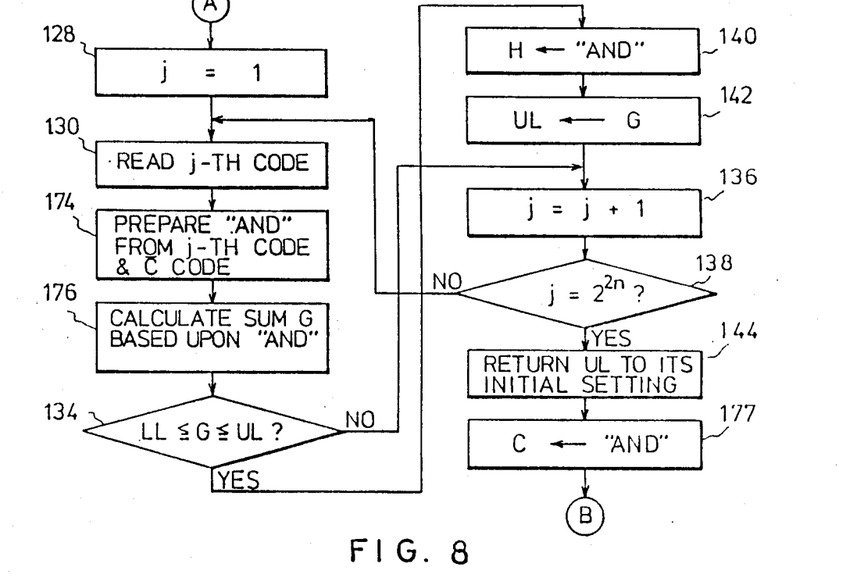
FIG. 8 is a flow chart representing a combination selecting sequence of operation of the second embodiment.

The program in FIG. 7 and 8 differs from the program "shown in FIG. 4–6". In the program of FIGS. 7 and 8 there is a jump to step 124 when the answer is "NO" in step 104, 110, 114 or 120. But in the program of FIGS. 4–6, steps 104, 110, 114 and 120 are repeated until "YES" is obtained. By this modification i.e., the program in FIGS. 7 and 8 the emptied chambers are excluded from combination until it is reloaded and the weighing operation of new product is completed. Other differences are the insertion of new step 164 between steps 106 and 108, new step 166 between steps 108 and 110 and new step 167 between steps 112 and 114, and similar insertion of new step 168 between steps 116 and 118, new step 170 between steps 118 and 120 and new step 172 between steps 122 and 124. By this modification, loading flags F1i and F2i are provided for the first and second chambers 24 and 26 of each weighing hopper $22_i$. Each flag is set to logic "1" when the corresponding chamber begins to be loaded and reset to logic "0" when the weight of product in said chamber is stored in the corresponding memory location i.e., weighing has ended. The object of these flags is to exclude from the combination selection those chambers which are currently being loaded and weighed. More specifically, if the loading has been commenced (if "YES") in step 164 (or 168), step 110 (or 120) follows and, if the weighing is not yet completed (if "NO") in step 110 (or 120), step 124 follows and the converter is incremented for handling the next-numbered weighing hopper.

A further difference in this modification, as shown in FIG. 8, is the substitution of steps 174 and 176 for step 132 of the combination selecting sequence and the addition of step 177 at the end of this sequence. In the combination selecting sequence of FIG. 5, the sum weight G was calculated in step 132 based upon the j-th combination code. It is however necessary in the modified sequence of FIGS. 7 and 8 to exclude those weighing chambers which were included in the preceding selected combination i.e., the empty weighing chambers must be excluded. For this purpose, the code of the selected combination is stored in another memory location C and the complement of the stored code (hereinunder referred to as "$\overline{C}$ code") and j-th code are Anded bit by bit to obtain a new binary code (hereinunder referred to as "AND code"). It will be understood that any bit of the $\overline{C}$ code corresponding to the selected chamber is "0" and, therefore, the corresponding bit of AND code is always "0". Thus in step 176 the sum weight G is calculated based upon this AND code, exclusive of those weighing chambers which were included in the preceding selected combination. In step 140 this and code is stored in location H. In step 177, the AND code indicative of the selected combination is transferred to location C for use in the next combination selection.

The unloading sequence of this modification is similar to that of FIG. 6 and for brevity is not repeated in another figure. However the inquiry in steps 148 and 154 must be made with respect to the corresponding bit of the AND code in location C but not to the bit of j-th code in location H.

Figure 9:
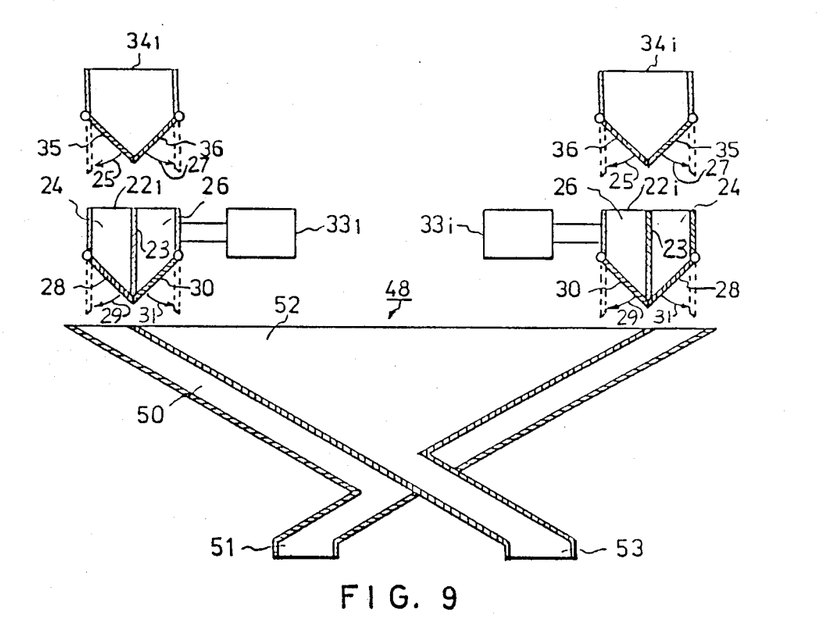
FIG. 9 is a schematic sectional side view representing an essential mechanical configuration of a third embodiment of this invention.
Figure 10:
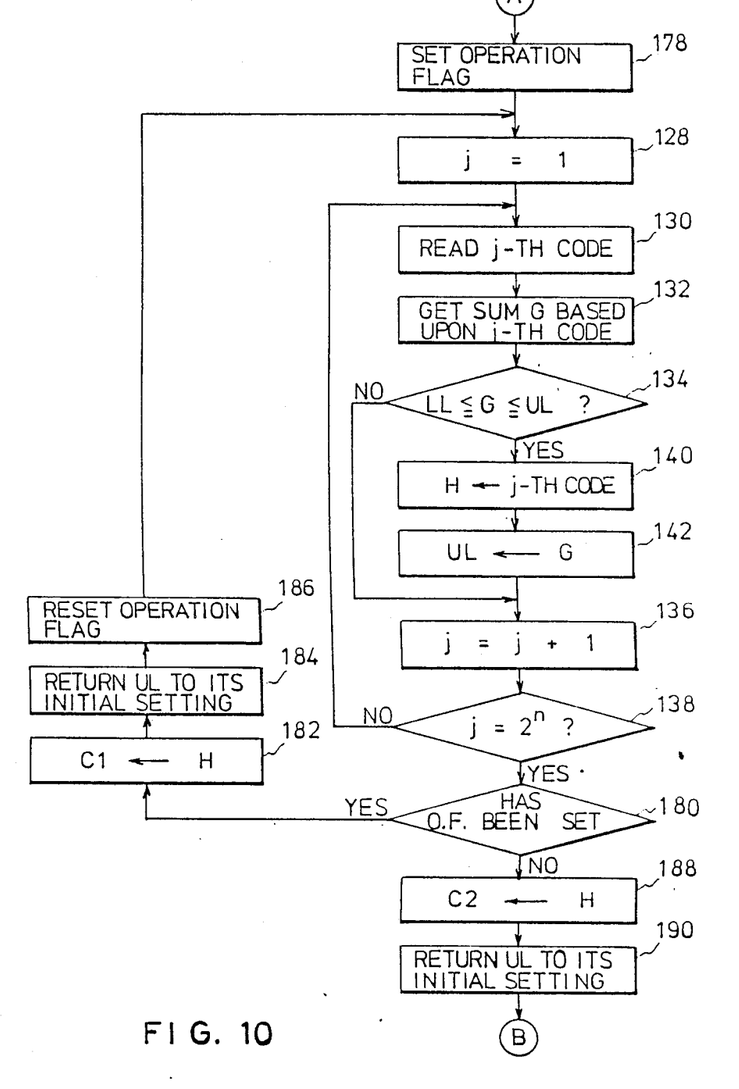
FIG. 10 is a flow chart representing a combination selecting sequence of operation of a fourth embodiment of this invention.

FIGS. 9 and 10 show a third embodiment of the invention, whose mechanical difference from the first and second is that a double collection chute device 48 is provided in place of the single collection chute device 20 (FIG. 2). As shown in FIG. 9, the chute device 48 includes two funnel-like chutes 50 and 52 arranged concentrically or coaxially in superposed relationship with their bottom outlets 51 and 53 disposed apart from each other. The chute device 48 is arranged to receive product from the first chambers 24 of all weighing hoppers $22_1$ to $22_n$ into the outer chute 50 and product from the second chambers 26 thereof into the inner chute 52. As readily understood from the drawing, this machine can serve as two independent combination weighing machines having common weighers or weight sensing units $33_1$ to $33_n$ which are relatively expensive. This embodiment can substantially double the delivery rate of product in addition to the abovementioned economical advantage, while maintaining the accuracy of the combination selection.

In the third embodiment, the loading sequence may be same as that of the first embodiment as shown in FIG. 4 and will not be described further. In this embodiment, however, the maximum number of weighing chambers which can participate in each combination selection is n and, therefore, the total number of possible combinations is $2^n-1$, as well known in the art. Thus, $2^n-1$ combination codes are stored in the ROM of microcomputer 42 and used for selecting the first and second chambers 24 and 26 in an alternating fashion. Chambers are selected using an operation flag which assumea logic "1" or "0" level.

In the first step 178 of the combination selecting sequence in FIG. 10 the operation flag is set to logic "1". The first (j=1) combination code is specified in step 128 and the j-th (initially j=1) code is read out from ROM in step 130. Based upon this code a combined sum weight is calculated in step 132 using only with the weights of product in the first chambers 24. Steps 130 to 142 are repeated in the same manner as the first embodiment of FIG. 5 and when the number j reaches $2^n$ in step 138, it is inquired, in step 180, whether the operation flag has been set or not. Initially, the answer is "YES" and in step 182 the current content of memory location H, which corresponds to the selected combination, is transferred to another location C1. The upper limit value is then returned to its initial setting in step 184 and the operation flag is reset to "0" in step 186. Similar operations are repeated starting from step 128, the sum weight G is calculated in step 132 with the weights of product in the second chambers 26 of all weighing hoppers and the sum weight of the selected combination is stored in to another memory location C2 in step 188 since the operation flag has been reset. The upper limit is returned to the initial value in step 190 and the unloading sequence is executed.

The unloading sequence of the third embodiment is same that of the first embodiment as shown in FIG. 6 except that the inquiry in step 148 and 154 is made with respect to each bit of combination codes stored in memory locations C1 and C2, respectively, but not in location H. Thus, the product batches included in the two selected combinations are discharged almost concurrently into both collection chutes 50 and 52 and delivered separately out of two outlets 51 and 53 to respective receiving devices (not shown).

A fourth embodiment is a modification of the third embodiment, which can effect "double-shift" operation as in the second embodiment. The loading sequence of this embodiment is same that of the second embodiment shown in FIG. 7 and no further description will be made thereof. The combination selecting sequence of this embodiment will be described below with reference to FIG. 11.

Figure 11:
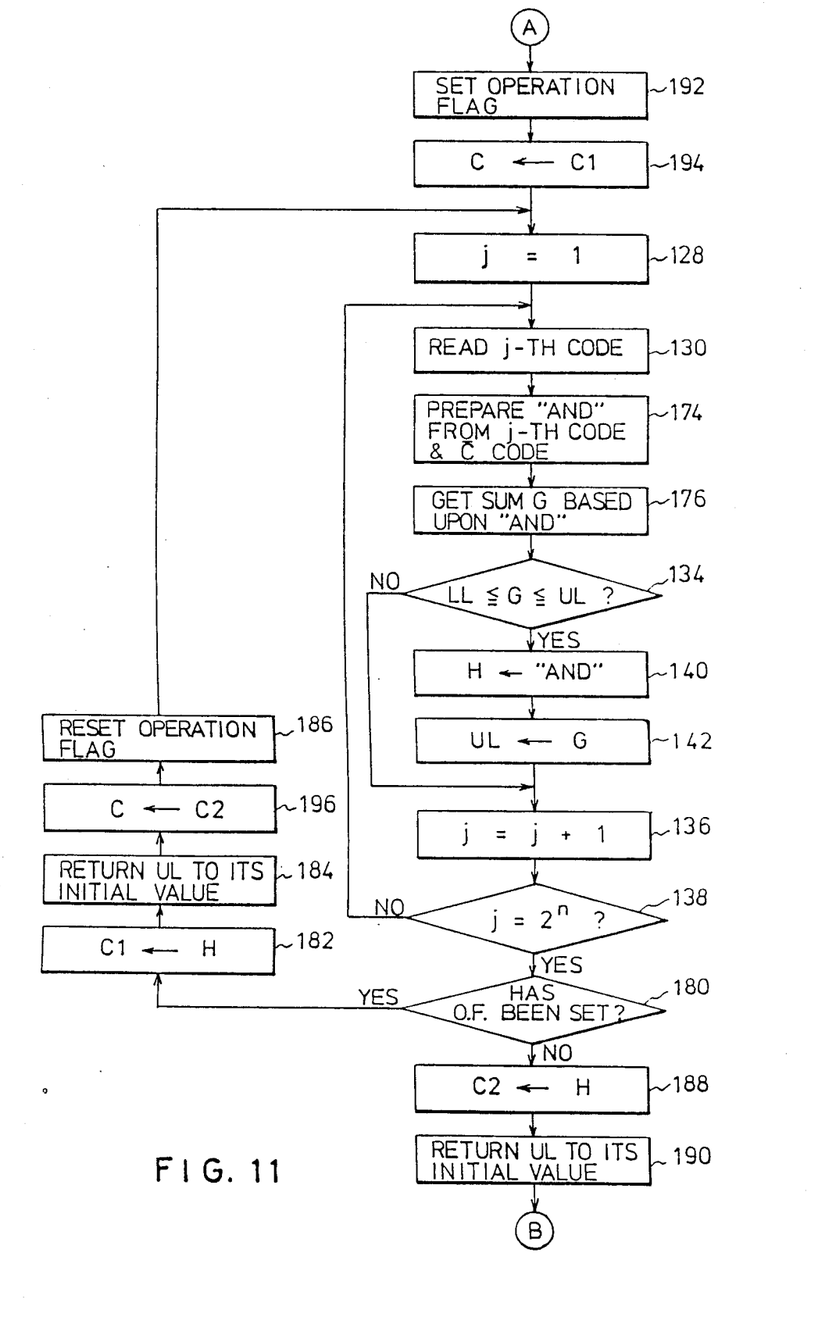

As in the third embodiment, an operation flag is used also in this fourth embodiment and set intially "1" in step 192. Next, the content of memory location C1 is transferred to memory location C in step 194. The content of memory location C1 is a combination code indicative of the combination selected in the preceding cycle and stored in location C1 in step 182 as described later and it initially may be zero (empty). Then, the count value j is set to "one" in step 128 as described previously and the j-th (now, first) combination code is read from ROM in step 130. In the following steps 174 and 176, which are the same as the second embodiment, the j-th code and $\overline{C}$ code are Anded and the sum weight G is calculated based upon the resultant AND code. The remaining steps of this sequence are the same as those of the third embodiment of FIG. 10, except that step 196 is inserted between steps 184 and 186. In step 196 the content of memory location C2 which has been written therein in step 188 in the preceding cycle, is transferred to location C for use in step 174.

The unloading sequence of this fourth embodiment is same as that of the third embodiment.

The third and fourth embodiments can be modified to be capable of delivering two kinds of product batches having different weight ranges (or UL and LL) from two outlets 51 and 53, respectively. To this end in FIGS. 10 and 11, step 184 may be altered to "Change UL and LL into their first values" and that of step 190 may be altered to "Change UL and LL into their second values".

Figure 12:
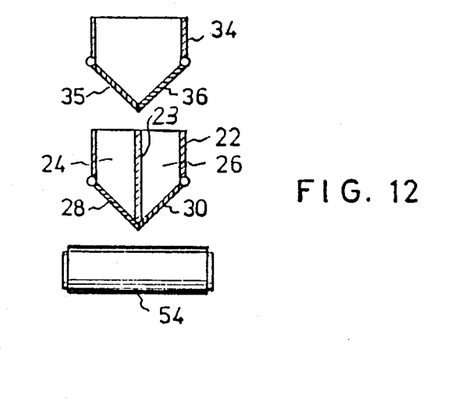
FIG. 12 is a schematic sectional side view representing a part of mechanical configuration of a fifth embodiment of this invention.
Figure 13:
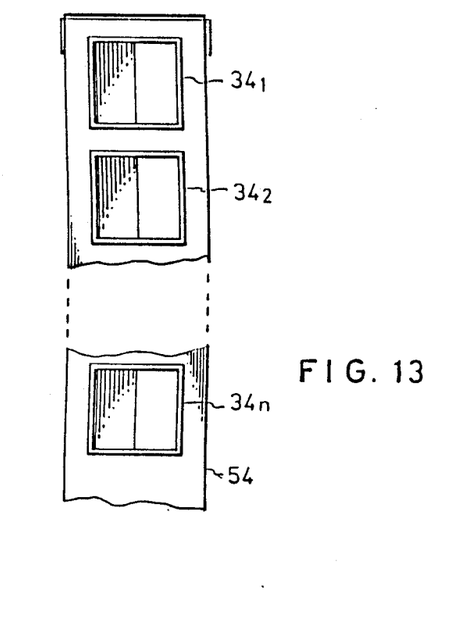
FIG. 13 is a schematic plan view corresponding to FIG. 12.

FIGS. 12 and 13 show a fifth embodiment of the invention. In this embodiment, weighing hoppers 22 and feeding hoppers 34 are arranged linearly and a belt conveyer 54 is disposed under these hoppers for collecting product discharged therefrom, instead of the funnel-like collection chute. This embodiment can use the same programs as the first and second embodiments and thus serve the same function.

Figure 14:
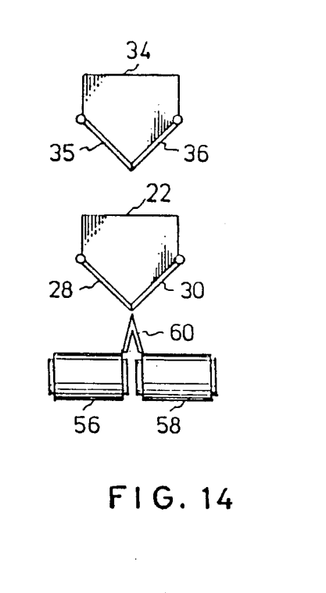
FIG. 14 is a schematic side view representing a part of the mechanical configuration of a sixth embodiment of this invention.

A modification of the fifth embodiment is shown in FIG. 14. In this sixth embodiment, a pair of belt conveyers 56 and 58 are provided for receiving product of the first and second chambers of weighing hoppers, discharged respectively through gates 28 and 30 on either side of a separator member 60. As readily appreciated, this modification can use the same programs as the third and fourth embodiments and thus serve the same function.

While the invention has been described with reference to certain specific embodiments a number of "variations, modifications" and changes can be made within the scope of invention as claimed in the appended claims. For example, each weighing hopper may be divided into three or more chambers, or a single weigher or weight sensor may be associated with two or more weighing hoppers having a single chamber each. The microcomputer programs for these cases will be easily anticipated by those skilled in the art. The feeding device for automatically feeding product to each feeding hopper 34 may be omitted and, in addition, the feeding hoppers 34 themselves may also be omitted for manual loading of each feeding or weighing hopper. The linear arrangement of the fifth or sixth embodiment will be suitable for this system.

We claim:

1. A combination weighing machine comprising a plurality of weighing units for weighing respective quantities of product to provide corresponding weight signals, and combination arithmetic means for combining said weight signals to select a combination having a sum weight satisfying a predetermined weight condition; characterized in that each of said weighing units includes a single wieghing hopper, partition means dividing said weighing hopper into a plurality of product containers, a single weight sensor coupled to said weighing hopper for measuring the total weight of product in said containers, a plurality of weight memories corresponding respectively to said containers, and weight calculating means for calculating the weights of product in the respective containers from the contents of said weight memories and the total weight from said weight sensor and storing the calculated weights in said corresponding weight memories, and said combination arithmetic means is operable to select a combination based upon the contents of said weight memories.

2. A combination weighing machine as set forth in claim 1 wherein each said weighing hopper has first and second discharge gates for discharging product from said product containers, said first and second discharge gates forming a "V", said partition being positioned generally in-line with the vertex of the discharge gates.

3. A combination weighing machine as set forth in claim 2 wherein said first and second discharge gates each pivotally engage an opposing side of said weighing hopper.

4. A combination weighing machine as set forth in claim 3 further comprising a loading hopper positioned above each weighing hopper having first and second discharge doors for discharging product from said loading hopper to said product containers, said first and second discharge doors forming a "V", said partition being positioned generally in-line with the vertex of the discharge doors.

5. A combination weighing machine comprising:
a plurality of weighing units for weighing respective quantities of product to provide corresponding weight signals, each of said weighing units including a plurality of product containers, a single weight sensor for measuring the total weight of product in said containers, and a plurality of weight memories corresponding respectively to said containers;
weight calculating means for calculating the weights of product in the respective containers from the contents of said weight memories and the total weight from said weight sensor and storing the calculated weights in said corresponding weight memories;
combination arithmetic means for combining said weight signals to select a combination having a sum weight satisfying a predetermined weight condition, said combination arithmetic means being operable to select a combination based upon the contents of said weight memories; and
a plurality of chutes for collecting product discharged from said weighing units, said chutes corresponding respectively to said product containers of each weighing unit, said combination arithmetic means being operable to select a combination based only upon the contents of said memories belonging to the product containers corresponding to each chute.

6. A combination weighing machine comprising a plurality of weighing units, each including a single weighing hopper having a partition therein dividing said hopper into at least two chambers forming first and second product containers adapted to hold separate quantities of product, a single weight sensor associated with each said weighing hopper for measuring the total weight of product in the containers of the weighing hopper, memory means for storing first weight values corresponding to the weight of product in said first product container of at least some of the weighing hoppers as sensed by the respective weight sensors and second weight values corresponding to the weight of product in said second product container of at least some of the weighing hoppers, means for calculating each of said second weight values by computing the difference between said first weight value and a third weight value corresponding to the total weight of product in said first and second product containers of a respective weighing hopper as sensed by the respective weight sensor, and combination arithmetic means for combining said first and/or second weight values of at least some of the weighing hoppers as stored in said memory means to select a combination of weight values having a sum weight value satisfying a predetermined weight condition.

7. A combination weighing machine as set forth in claim 6 wherein each said weighing hopper has first and second discharge gates for discharging product from said first and second product containers, respectively, said first and second discharge gates forming a "V", said partition being positioned generally in-line with the vertex of the discharge gate.

8. A combination weighing machine as set forth in claim 7 wherein said first and second discharge gates each pivotally engage an opposing side of said weighing hopper.

9. A combination weighing machine as set forth in claim 8 further comprising a loading hopper positioned above each weighing hopper having first and second discharge doors for discharging product from said loading hopper to said first and second product containers, respectively, said first and second discharge doors forming a "V", said partition being positioned generally in-line with the vertex of the discharge doors.

10. A combination weighing machine comprising a plurality of weighing units, each including a plurality of product containers adapted to hold separate quantities of product, a single weight sensor associated with each weighing unit for measuring the total weight of product in the containers of the weighing unit, memory means for storing first weight values corresponding to the weight of product in a first product container of at least some of the weighing units as sensed by the respective weight sensors and second weight values corresponding to the weight of product in a second product container of at least some of the weighing units, means for calculating each of said second weight values by computing the difference between said first weight value and a third weight value corresponding to the total weight of product in said first and second product containers of a respective weighing unit as sensed by the respective weight sensor, a first chute for collecting product discharged from certain of said containers of the weighing units, a second chute for collecting product discharged from other of said containers of the weighing units, and combination arithmetic means for combining said first and/or second weight values of at least some of the weighing units as stored in said memory means to select a combination of weight values having a sum weight value satisfying a predetermined weight condition, said combination arithmetic means being operable to select a first combination from the weights of product in said certain containers and a second combination from the weights of product in said other containers.

11. A method of combination weighing utilizing a plurality of weighing units, each unit comprising a plurality of product containers and a single weight sensor for measuring the total weight of product in the containers, and further utilizing memory means for storing weight values corresponding to the weights of product in the containers of the weighing units, said method comprising:
(a) storing in said memory means first weight values corresponding to the weight of product in a first product container of at least some of the weighing units as sensed by the respective weight sensors;

(b) storing in said memory means second weight values corresponding to the weight of product in a second product container of at least some of the weighing units, each second weight value being determined by computing the difference between said first weight value and a third weight value corresponding to the total weight of product in said first and second product containers of a respective weighing unit as sensed by the respective weight sensor;

(c) effecting a combination arithmethic operation using said first and/or second weight values of at least some of the weighing units as stored in said memory means to select a combination of values having a sum weight value satisfying a predetermined weight condition;

(d) combining said first and/or second weight values of certain product containers of at least some of the weighing units to select a first combination of values having a sum weight value satisfying a predetermined weight condition;

(e) combining said first and/or second weight values of other product containers of at least some of the weighing units to select a combination of values having a sum weight value satisfying a predetermined weight condition;

(f) unloading the product containers corresponding to said first selected combination into a first product delivery system; and (g) unloading the product containers corresponding to said second selected combination into a second product delivery system.

12. A combination weighing apparatus for producing a weight of product closely approximating a target weight comprising:

a plurality of weigh scales, each scale having multiple bins for receiving and discharging multiple quantities of product respectively and a sensor detecting the aggregate weight of product in the bins of the scale at any given time and generating a corresponding weight signal;

at least two discharge chutes for receiving product from the plurality of weighing scales;

feeder means for delivering a quantity of product to each bin of the scales;

reading and storing means connected with the plurality of scales and responsive to the generated weight signals for determining and storing separately the weight of product in each bin of the scales;

combination searching means connected with the reading and storing means for selecting from the stored weights an acceptable combination of bins that yields a total weight of product closely approximating a target weight; and control means, responsive to the combination searching means, for discharging product in the bins associated with one acceptable combination into the same discharge chute.

13. A method of obtaining a weight of product closely approximating a target weight by combining selected weights of product from a plurality of weighing scales, comprising the steps of:

providing on each weight scale of the plurality a number of at least two bins for receiving and discharging weights of product, each weigh scale generating a weight signal representative of the aggregate weight of product in all of the bins of the scale at any given time;

delivering a quantity of product to each bin of the scale in the plurality, each bin receiving the delivered product at a time different from the other bins of the same scale;

reading the weight signals from the scales after each delivery, and determining the weight of product in each bin from the read weight signals;

searching the determined weights of product in the bins for selection of an acceptable combination of bins that yields a combined weight of product closely approximating a target weight;

providing a plurality of discharge paths and receivers equal in number to the number of bins on each scale for discharging to the receivers combined weights of product from a corresponding plurality of acceptable combinations of bins without refilling the bins; and discharging the combined weight of product into the receivers from the acceptable combination of bins.

14. A method of obtaining a weight of product as defined in claim 13 wherein the step of discharging product from acceptable combinations of bins includes diverting the product from all bins of one acceptable combination into the same discharge path.

15. A method of obtaining a weight of product as defined in claim 13 wherein:

each bin of a sclae is associated with a discharge path different from the other bins on the same scale;

the step of searching includes searching the set of bins associated with one discharge path for an acceptable combination, and searching another set of bins associated with another discharge path for another acceptable combination; and the step of discharging includes discharging all bins of the acceptable combinations into their associated discharge paths.

* * * * *